United States Patent Office 3,842,144
Patented Oct. 15, 1974

3,842,144
PROCESS FOR PRODUCING BLENDS OF VINYL CHLORIDE RESIN COMPOSITION
Takashi Tanaka, Haruhiko Yusa, and Susumu Chubachi, Iwaki, Japan, assignors to Kureha Kagaku Kogyo Kabushiki Kaisha, Tokyo-to, Japan
No Drawing. Filed Oct. 6, 1972, Ser. No. 295,577
Claims priority, application Japan, Oct. 7, 1971, 46/78,996; May 22, 1972, 47/50,549
Int. Cl. C08f 15/00, 14/00
U.S. Cl. 260—876 R       7 Claims

ABSTRACT OF THE DISCLOSURE

The invention relates to a process for production of vinyl chloride resin compositions by uniform blending of 95 to 70 parts by weight of vinyl chloride resin, and 5 to 30 parts by weight of a modifying component obtained by graft-polymerizing upon a cross-linked copolymer rubber latex a first and then a second grafting component in a sequential two-stage process.

---

This invention relates to a process for producing vinyl chloride resin composition which is excellent in its impact strength, and, at the same time, has satisfactory weather-resistance and processability. More particularly, the invention is concerned with a method of producing a modifying component consisting of a multicomponent type resin, and a polymer blend of such modifying component and vinyl chloride resin, the former being obtained by graft-polymerizing a grafting component consisting of styrene and methylmethacrylate and containing therein a cross-linking agent upon a cross-linked copolymer rubber consisting of acrylic acid alkyl ester and butadiene, or the cross-linked copolymer rubber of the abovementioned composition, a part of which has been substituted for methylmethacrylate.

As has been well known, voinyl chloride resin possesses various excellent properties, on account of which it has been widely used in variety of fields. However, it has a fatal disadvantage such that it is fragile on impact.

With a view, therefore, to improving the impact strength of this resin, much research and experimentation has been performed. From such research, a resin obtained by graft-polymerizing styrene and methylmethacrylate upon butadiene type rubber (the so-called "MBS resin"), or a resin obtained by graft-polymerizing styrene and acrylonitrile upon the butadiene type rubber (the so-called "ABR resin") has recently attained notable fame and development as an impact modifiers of vinyl chloride resin, as a result of which the general notion that vinyl chloride resin is inherently vulnerable to impact is now declining.

However, even the vinyl resin composition blended with the abovementioned MBS or ABS resin is still poor in its weather resistance, and is not durable under long outdoor use. This type of vinyl chloride resin composition usually possesses high impact strength immediately after shaping, but once the shaped article is used outdoors, it can no longer maintain the high impact strength possessed immediately after shaping and such use abruptly reduces such strength. For this reason, use of the resin composition as this structural material has been extremely limited.

The principal cause for reduction in impact strength of a blended resin composition of vinyl chloride and MBS (or ABS) resins is due to numerous double bonds contained in butadiene. In other words, deterioration of the rubber component due to ultra-violet rays during the outdoor use inevitably affects properties of the MBS (or ABS) resin.

From this standpoint, much research and study has been performed to improve impact modifiers for the vinyl chloride resin by using a kind of rubber having excellent weather resistance other than butadiene rubber.

For example, U.S. Pat. 3,264,373 discloses a method, in which methylmethacrylate monomer is graft-polymerized upon a rubber copolymer of butadiene and alkyl acrylate, and British Pat. 1,027,710 discloses a method, in which vinyl chloride monomer is grafted upon a rubber copolymer of ethylene and vinyl acetate.

These impact modifiers, however, are inferior in their ability to impact the impact strength to vinyl chloride resin as blended in comparison with the vase of blending MBS or ABS resin with the vinyl chloride resin.

Some other impact modifiers gave an extremely bad effect to vinyl chloride, when blended, in respect of kneadability and processability of the blended resin composition. Still some others cause considerable decrease in tensile strength of the resultant blend of vinyl chloride resin, and, moreover, another unfavorable phenomenon takes place such that when a sheet made of the blended vinyl chloride composition is bent or folded, there occurs whitening of the sheet at its bent portion.

The reason why both MBS and ABS resins have recently invited more attention from industries in general as the reinforcing agents for vinyl chloride resin is that they are not only excellent in their effect of imparting the impact strength to vinyl chloride resin, but also retain its various favorable properties such as processability, and so forth.

It is therefore an object of the present invention to provide a vinyl chloride resin composition having excellent impact strength and weather resistance.

It is another object of the present invention to provide an improved method of producing an impact modifying component to be blended with vinyl chloride resin to give excellent impact strength and weather resistance to the resin composition.

The foregoing objects and other objects of the present invention will become more apparent from the following description of the invention and a few preferred examples thereof.

As the result of long and continuous studies made by the present inventors with the abovementioned problems in mind, it has been discovered that the intended vinyl chloride resin composition can be obtained by blending from 95 to 70 parts by weight of vinyl chloride resin or copolymers containing vinyl chloride as the principal constituent and from 5 to 30 parts by weight of a multi-component type resin obtained by salting-out or acid deposition of a graft polymer latex produced from graft-polymerization of a monomer mixture consisting of styrene and methylmethacrylate, and containing a small quantity of cross-linking agent, upon a cross-linked copolymer rubber latex resulting from emulsion-polymerization of a monomer mixture consisting of butadiene and acrylic acid alkyl ester having the alkyl group of 2 to 12 carbon atoms and a small quantity of a cross-linking agent, or a monomer mixture consisting of acrylic acid alkyl ester, butadiene, methylmethacrylate, and a small quantity of a cross-linking agent and further graft-polymerization upon the resultant graft-polymer of methylmethacrylate containing therein a small quantity of cross-linking agent.

The invention will now be described in more detail hereinbelow.

A monomer mixture consisting of 60 to 95% by weight of acrylic acid alkyl ester having an alkyl group of from 2 to 12 carbon atoms and 40 to 5% by weight of butadiene, or a monomer mixture consisting of 40 to 95% by weight of acrylic acid alkyl ester having an alkyl group of from 2 to 12 carbon atoms, 40 to 5% by weight of butadiene, and 0.1 to 30% by weight of methylmethacrylate is subjected to emulsion-polymerization in the presence of 0.01 to 3% by weight of a cross-linking agent to obtain a cross-linked copolymer rubber latex. More than 95% by weight of the rubber component in this latex has the particle size range of from 0.05 to 0.1 micron.

To the thus produced rubber latex containing therein 50 to 75 parts by weight of copolymer rubber, 50 to 25 parts by weight of a monomer mixture consisting of styrene and methylmethacrylate and containing therein 0.01 to 3% by weight of a cross-linking agent is added, and batch is subjected to the graft polymerization.

The emulsifier to be used in this emulsion polymerization is a higher fatty acid salt such as, for example, sodium stearate, potassium oleate, etc.

The free radical catalyst to be used for this emulsion polymerization, is for example cumene hydroperoxide, benzoyl peroxide, lauroyl peroxide, tertiary butyl hydroperoxide, alkali metals persulfate, ammonium persulfate. Further, in combination with such peroxide compounds, there may be used various reducing agent such as metals like iron, cobalt, etc., and a dialkali metal persulfate, etc. (as Redox catalyst).

The temperature for the emulsion polymerization usually ranges from 0 to 80° C. in both rubber and graft polymerizations. The more preferable range is from 40 to 70° C.

For the graft polymerization, there is a method, in which the components to be grafted upon the rubber latex are polymerized in a single stage. It has, however, been recognized that, when the graft polymerization is carried out in two stages, miscibility of the resulting multi-components type resin with vinyl chloride resin can be effectively improved. This is explained in more detail as follows.

The monomer component to be grafted-polymerized upon the rubber latex is divided into two portions of (1) 10 to 90% by weight of monomer mixture consisting of styrene and methylmethacrylate with the former as the principal constituent and containing therein a small amount of a cross-linking agent; and (2) 90 to 10% by weight of methylmethacrylate containing therein a small quantity of a crosslinking agent. The first grafting component is first grafted upon the copolymer rubber latex, and, upon substantial completion of this first polymerization stage, the second grafting component is grafted.

A vinyl chloride resin composition, in which an impact modifier obtained by simply graft-polymerizing a monomer mixture consisting of styrene, methylmethacrylate, and/or acrylonitrile upon alkyl-acrylate rubber latex is blended with vinyl chloride, has been well known. This graft polymer as an impact modifier, however, is poor in its miscibility with vinyl chloride resin with the consequence that the weather resistance, processability, and impact strength of the blended resin composition are not very satisfactory.

It has been found out, therefore, that the multi-component type resin obtained by using the cross-linked copolymer rubber latex and by mixing a cross-linking agent into the monomer mixture of styrene and methylmethacrylate to be grafted upon this cross-linked copolymer rubber latex, according to the present invention, when used as the impact modifier, definitely imparts to vinyl chloride resin to be blended therewith an impact strength which is equal to or higher than that of the MBS resin, and, at the same time, yields the vinyl chloride resin composition having excellent weather-resistance, processability, tensile strength, and low stress-whitening on bending.

In the present invention, the cross-linked copolymer obtained by emulsion polymerization of a monomer mixture consisting of acrylic acid alkyl ester and butadiene, or the monomer mixture, a part of which has been substituted for methylmethacrylate, should be essentially used as the trunk polymer.

The amount of butadiene to be copolymerized with acrylic acid alkyl ester, or a mixture monomer of acrylic acid alkyl ester and methylmethacrylate can be less than 40% by weight to give sufficient impact-strength-imparting-effect. When the amount exceeds 40% by weight, a problem arises with respect to the weather-resistance of the vinyl chloride resin composition, which cannot be solved without addition of a large quantity of expensive photo-stabilizer and antioxidation agent. This weather-resistance has been found to improve further by substituting a part of acrylic acid alkyl ester or butadiene constituting the monomer mixture for methylmethacrylate, which is then polymerized into a cross-linked terpolymer rubber. The quantity of methylmethacrylate to be substituted may preferably be from 0.1 to 30% by weight. A quantity exceeding 30% by weight would reduce the impact-strength-imparting effect to vinyl chloride resin.

As the acrylic acid alkyl ester to be used in the monomer mixture are those having the alkyl group of 2 to 12 carbon atoms such as, for example, ethyl acrylate, butyl acrylate, acryl acrylate, 2-methylbutyl acrylate, 2-ethylhexyl acrylate, and so forth.

The quantity of styrene and methylmethacrylate to be grafted on the cross-linked copolymer rubber should preferably be in the range of from 50 to 25 parts by weight with respect to from 50 to 75 parts by weight of the cross-linked copolymer rubber. When the quantity of the rubber component is below 50 parts by weight, the impact-strength-imparting-effect to vinyl chloride resin is small, while the quantity above 75 parts by weight is liable to cause agglomeration at the time of the salting-out or acid deposition of the rubber component or at the time of blending with vinyl chloride resin powder with the result that no sufficient impact-strength-imparting effect can also be obtained.

It is further possible that, prior to the graft polymerization of styrene and methylmethacrylate monomer mixture containing a crosslinking agent upon the cross-linked copolymer rubber latex (95% by weight of the rubber particles falls within the particle size range of from 0.05 to 0.1 micron), the coagulation of the rubber latex be carried out to bring the average particle size of the coagulated rubber particles to a range of from 0.12 to 0.3 micron. In this case, the "coagulated particle" is represented in terms of a diameter of the coagulate formed by assembly of spherical polymer particles.

For the coagulating agent, mineral acids such as hydrochloric acid, sulfuric acid, etc., inorganic salts, organic acids, and organic acid anhydride which are generally used as the latex coagulant may be used.

The rubber latex subjected to the coagulation operation exhibits further imparting effect to vinyl chloride resin in comparison with the rubber latex which has not been coagulated. Also, such coagulated rubber minimizes or suppresses variations in the impact strength of shaped product of the vinyl chloride resin composition caused by difference in the degree of dispersion of the modifier within polyvinyl chloride resulting from mixing and kneading, whereby constant, high impact strength of the shaped articles can be secured.

The cross-linking agent to be used in both rubber and grafting components should be selected from among those which are readily polymerizable with the monomers. Examples of such cross-linking agents are: aromatic polyfunctional vinyl compounds such as divinylbenzene, divinyltoluene, etc., and glycol dimethacrylate compounds such as ethylene glycol dimethacrylate, diethylene glycol dimethacrylate, triethylene glycol dimethacrylate, etc.

The vinyl chloride resin for blending purposes according to the present invention is either homopolymer of vinyl chloride, or copolymer containing more than 70% by weight of vinyl chloride.

In order to enable skilled persons in the art to reduce the present invention to practice, the following preferred examples are presented. It should, however, be noted that these examples are illustrative only, and that any modification may be made thereof within the extent of protection as set forth in the appended claims.

EXAMPLE 1

The following component materials were charged into a stainless steel autoclave provided with an agitator, and polymerization was conducted at a temperature of 45° C. for 16 hours to obtain the rubber latex.

| Cross-linked trunk polymer rubber: | Wt. parts |
|---|---|
| 2-ethyl-hexyl acrylate | 35 |
| Butadiene | 20 |
| Methylmethacrylate | 10 |
| Ethyleneglycol dimethacrylate | 0.65 |
| Diisopropylbenzene hydroperoxide | 0.13 |
| Ferrous sulfate ($FeSO_4 \cdot 7H_2O$) | 0.002 |
| Ethylenediamine tetra-acetic acid disodium salt | 0.003 |
| Sodium formaldehyde sulfoxylate | 0.03 |
| Potassium oleate | 0.6 |
| Distilled water | 190 |

To the total amount of the rubber latex thus obtained, 0.065 part by weight of sodium sulfosuccinate dioctyl ester was added to sufficiently stabilize the same, after which 50 parts by weight of 0.2% hydrochloric acid aqueous solution was gradually added to coagulate.

The average particle size of the rubber latex after the coagulation was recognized to have increased to 0.17 micron in diameter from about 0.08 micron prior to its coagulation.

Then, the pH value of the latex was resumed to 10.0 by adding aqueous solution of sodium hydroxide, after which a first grafting component of the following composition was added to the coagulated rubber latex to conduct the polymerization reaction for four hours at a temperature of 60° C. The yield of the first graft polymerization was approximately 98%.

| First grafting component: | Wt. parts |
|---|---|
| Styrene | 15 |
| Methylmethacrylate | 5 |
| Divinylbenzene | 0.2 |
| Diisopropylbenzene hydroperoxide | 0.025 |
| Sodium formaldehyde sulfoxylate | 0.01 |

Subsequently, a second grafting component of the following composition was added to the thus obtained graft polymer latex, and further polymerization was conducted for 7 hours at 60° C.

| Second grafting component: | Wt. parts |
|---|---|
| Methylmethacrylate | 15 |
| Divinylbenzene | 0.2 |
| Diisopropylbenzene hydroperoxide | 0.01 |
| Sodium formaldehyde sulfoxylate | 0.005 |

The resulted latex was found to contain approximately 28% of graft-copolymer, which indicates that the graft-polymerization was complete.

To this latex, 0.5 part by weight of 2,6-ditertiarybutyl-paracresole and 0.5 part by weight of dilaurylthiopropionate as the anti-oxidation agents were added, and, through the processes of the acid-deposition, dehydration, and desiccation, a multi-component type resin in powder form was obtained.

Next, 12.5 parts by weight of this resin was added to 87.5 parts by weight of vinyl chloride resin (P.D. 700) together with 2 wt. parts of dibutyltin-maleate, and the batch was kneaded for three minutes by kneading rolls, the surface temperature of which was maintained at 160° C. The condition of the resin on the roll surface was recognized to have been well unified, which indicates that its processability is excellent.

From this kneaded resin composition, a plate of 3 mm. thick was manufactured by press-forming under a pressure of 150 kg./cm.$^2$ at 195° C.

The Charpy impact strength (according to ASTM-D-256) of this sample plate was 145 kg.cm./cm.$^2$, which figure is the remarkable increase in comparison with 3 kg.cm./cm.$^2$ of vinyl chloride resin alone.

Furthermore, a sample press sheet of 1 mm. thick produced in the same manner as that of the abovementioned sample plate was bent, and the degree of stress-whitening through bending was observed. Substantially no whitening could be recognized.

Also, 90 parts by weight of vinyl chloride resin (P.D. 1,000) and 10 parts by weight of the abovementioned multi-component resin powder containing 4 wt. parts of a lead-type stabilizer (on mixture of 50 wt. percent of tribasic lead sulfate; 25 wt. percent of dibasic lead stearate; 12.5 wt. percent of lead stearate; and 12.5 wt. percent of calcium stearate) and 0.2 wt. part of carbon black was roll-kneaded at a temperature of 190° C., and the blended resin composition was press-formed into a sample sheet of 3 mm. thick under a pressure of 150 kg./cm.$^2$. This plate was then subjected to an exposure test under artificially accelerated weathering conditions by means of a weather meter. The Charpy impact strength of this sample plate before light irradiation was 155 kg.cm./cm.$^2$, and that after 400 hours' light irradiation was 130 kg.cm./cm.$^2$, which figure indicates the remarkably excellent weather-resistance that the plate possesses.

Example 2

Multi-component polymer composition was produced in the same manner as in Example 1 above with the exception that composition of the cross-linked trunk polymer rubber and quantity of the cross-linking agent to be added to the component to be grafted on the rubber latex were varied as shown in Table 1 below.

TABLE 1

| | Trunk polymer rubber (part by weight) | | | | First graft component (part by weight) | | | Second graft component (part by weight) | |
|---|---|---|---|---|---|---|---|---|---|
| | BA | Bu | MMA | EDMA | ST | MMA | EDMA | MMA | EDMA |
| Present invention: | | | | | | | | | |
| A | 50 | 15 | 0 | 0.65 | 15 | 10 | 0.15 | 10 | 0.15 |
| B | 50 | 15 | 0 | 0.65 | 15 | 10 | *0.1 | 10 | *0.1 |
| C | 54 | 10 | 1 | 0.65 | 15 | 10 | 0.15 | 10 | 0.15 |
| D | 45 | 15 | 5 | 0.65 | 15 | 10 | 0.15 | 10 | 0.15 |
| E | 40 | 20 | 5 | 0.65 | 15 | 10 | 0.15 | 10 | 0.15 |
| F | 35 | 20 | 10 | 0.65 | 15 | 10 | 0.15 | 10 | 0.15 |
| G | 35 | 20 | 10 | 0.65 | 15 | 10 | 0.30 | 10 | 0.30 |
| Reference sample: | | | | | | | | | |
| H | 55 | 0 | 10 | 0.65 | 15 | 10 | 0.15 | 10 | 0.15 |
| I | 0 | 50 | 15 | 0.65 | 15 | 10 | 0.15 | 10 | 0.15 |
| J | 15 | 50 | 0 | 0.65 | 15 | 10 | 0.15 | 10 | 0.15 |
| K | 50 | 10 | 5 | 0.65 | 15 | 10 | 0.15 | 10 | 0 |

*DVB (divinyl benzene).
Note.—OA=2-ethyl-hexyl-acrylate; Bu=butadiene; MMA=methylmethacrylate; ST=styrene; EDMA= ethylene glycol dimethacrylate.

These multi-component type resins were blended with vinyl chloride resin at a blending quantity of 12.5 wt. parts of the modifier resin and 87.5 wt. parts of vinyl chloride resin and the properties of such resin compositions were tested. The results are as shown in Table 2 below.

TABLE 2

| | Charpy impact strength (kg cm / cm²) after exposure time of— | | | | Stress-whitening through bending | Processability |
|---|---|---|---|---|---|---|
| | 0 hrs | 100 hrs | 200 hrs | 400 hrs | | |
| Present invention: | | | | | | |
| A | 156 | 125 | 75 | 54 | Scarcely whitened | Indicated good grafting even by roll-kneading. |
| B | 160 | 130 | 107 | 77 | ...do... | Do. |
| C | 150 | 135 | 84 | 75 | ...do... | Do. |
| D | 154 | 132 | 125 | 120 | ...do... | Do. |
| E | 163 | 139 | 130 | 105 | ...do... | Do. |
| F | 155 | 137 | 133 | 130 | ...do... | Do. |
| G | 148 | 127 | 137 | 115 | ...do... | Do. |
| Reference sample: | | | | | | |
| H | 32 | 25 | 18 | 7 | ...do... | Do. |
| I | 158 | 35 | 26 | 10 | ...do... | Do. |
| J | 159 | 28 | 15 | 7 | ...do... | Do. |
| K | 105 | 35 | 17 | 15 | Notoriously whitened | Indicated poor grafting by roll-kneading. |

As will be apparent from the above Tables 1 and 2, only when the trunk polymer of a composition within the range of the present invention is used, and a cross-linking agent is added and polymerized with the grafting component to be grafted on the trunk polymer, the impact strength, weather resistance, processability, and stress-whitening through bending could be satisfactory.

EXAMPLE 3

Multi-component type resin was produced by the same manner as in Example 1 above with the exception that the coagulation of the rubber latex to be carried out prior to graft-polymerization of the first grafting component upon the rubber latex was not done, and that the composition of the trunk polymer rubber was varied as shown in Table 3 below.

TABLE 3

| | Trunk polymer rubber (part by weight) | | | | First graft component (part by weight) | | | Second graft component (part by weight) | |
|---|---|---|---|---|---|---|---|---|---|
| | OA | Bu | MMA | EDMA | ST | MMA | EDMA | MMA | EDMA |
| Present invention: | | | | | | | | | |
| L | 50 | 15 | 0 | 0.65 | 15 | 10 | 0.15 | 10 | 0.15 |
| M | 45 | 15 | 5 | 0.65 | 15 | 10 | 0.15 | 10 | 0.15 |
| N | 40 | 20 | 5 | 0.65 | 15 | 10 | 0.15 | 10 | 0.15 |
| O | 35 | 20 | 10 | 0.65 | 15 | 10 | 0.15 | 10 | 0.15 |
| Reference sample: | | | | | | | | | |
| P | 50 | 0 | 10 | 0.65 | 15 | 10 | 0.15 | 10 | 0.15 |
| Q | 0 | 55 | 10 | 0.65 | 15 | 10 | 0.15 | 10 | 0.15 |
| R | 15 | 50 | 0 | 0.65 | 15 | 10 | 0.15 | 10 | 0.15 |
| S | 55 | 10 | 0 | 0 | 15 | 20 | 0 | 0 | 0 |
| T | 55 | 10 | 0 | 0 | 0 | 35 | 0 | 0 | 0 |

TABLE 4

| | Charpy impact strength (kg.cm./cm.²) after exposure time of— | | | | Stress-whitening through bending | Processability |
|---|---|---|---|---|---|---|
| | 0 hrs. | 100 hrs. | 200 hrs. | 400 hrs. | | |
| Present invention: | | | | | | |
| L | 101 | 85 | 50 | 33 | Scarcely whitened | Indicated good grafting even by roll-kneading. |
| M | 85 | 80 | 58 | 39 | ...do... | Do. |
| N | 98 | 81 | 73 | 35 | ...do... | Do. |
| O | 105 | 87 | 55 | 33 | ...do... | Do. |
| Reference sample: | | | | | | |
| P | 30 | 26 | 17 | 5 | ...do... | Do. |
| Q | 103 | 45 | 20 | 7 | ...do... | Do. |
| R | 110 | 33 | 25 | 10 | ...do... | Do. |
| S | 60 | 43 | 28 | 8 | Notoriously whitened | Indicated poor grafting by roll-kneading. |
| T | 68 | 40 | 22 | 10 | ...do... | Do. |

As will be apparent from the above Tables, when the coagulation is not carried out, the impact strength prior to the light irradiation slightly declines, but the impact strength and the weather resistance of the resin composition are not affected.

What we claim is:

1. A method for producing vinyl chloride resin composition having excellent impact strength, weather resistance, and processability which consists essentially of uniform blending:

95 to 70 parts by weight of a vinyl chloride polymer selected from the group consisting of homopolymer of vinyl chloride, and copolymers of vinyl chloride containing therein more than 70% by weight of vinyl chloride; and 5 to 30 parts by weight of a multi-component type resin consisting of (a) 50 to 75 parts by weight of a cross-linked copolymer rubber which is an emulsion-polymerizate of a monomer mixture [selected from the group] consisting essentially of a mixture of 60 to 95% by weight of acrylic acid alkyl ester, 40 to 5% by weight of butadiene, and 0.01 to 3% by weight of a cross-linking agent, and (b) 50 to 25 parts by weight of monomer mixture consisting of 10 to 90% by weight of styrene and 90 to 10% by weight of methylmethacrylate and 0.01 to 3% of a cross-linking agent, the monomer mixture being graft-polymerized upon said cross-linked copolymer rubber.

2. The method according to claim 1 in which said acrylic acid alkyl ester has the alkyl group containing therein 2 to 12 carbon atoms, and selected from the group consisting of ethyl acrylate, butyl acrylate, acyl acrylate, 2-methylbutyl acrylate, and 2-ethyl-hexyl acrylate.

3. The method according to claim 1, in which said crosslinking agent is one selected from the group consisting of divinyl benzene, divinyl toluene, ethylene glycol dimethacrylate, diethylene glycol dimethacrylate, and triethylene glycol dimethacrylate.

4. A method for producing vinyl chloride resin composition having excellent impact strength, weather resistance, and processability which consists essentially of uniformly blending:

95 to 70 parts by weight of a vinyl chloride polymer selected from the group consisting of homopolymer of vinyl chloride, and copolymer of vinyl chloride containing therein more than 70% by weight of vinyl chloride, and 5–30 parts by weight of a multi-component type resin which is produced by the following steps:

(a) preparing a latex of a rubber polymer by polymerizing a monomer mixture consisting essentially of a mixture of 60 to 95% by weight of acrylic acid alkyl ester and 5 to 40% by weight of butadiene, in the presence of from 0.01 to 3% by weight of a cross-linking agent, said polymer latex containing from 50 to 75 parts by weight of said rubber polymer;

(b) adding to said latex from 50 to 25 parts by weight of styrene and methylmethacrylate in a ratio of 90 to 10% by weight of styrene, 10 to 90% by weight of methylmethacrylate and 0.01 to 3% by weight of a crosslinking agent copolymerizable with said monomers;

(c) dividing said monomer components into first and second grafting components, said first grafting component being composed of styrene and methylmethacrylate with styrene as the principal constituent and containing therein the crosslinking agent, and said second grafting component being composed of methylmethacrylate alone and containing therein the crosslinking agent;

(d) adding said first grafting component to said crosslinked copolymer rubber latex to be graft-polymerized thereupon;

(e) further adding said second grafting component to said graft-polymerized copolymer latex to be further grafted thereupon and (f) recovering the multi-component type resin from said graft-polymerized latex through the processes of salting out, dehydration and drying.

5. The method according to claim 4, in which said acrylic acid alkyl ester has the alkyl group containing therein 2 to 12 carbon atoms and selected from the group consisting of ethyl acrylate, butyl acrylate, acyl acrylate, 2-methyl-butyl acrylate, and 2-ethyl-hexyl acrylate.

6. The method according to claim 4, in which said crosslinking agent is one selected from the group consisting of divinyl benzene, divinyl toluene, ethylene glycol dimethacrylate, diethylene glycol dimethacrylate, and triethylene glycol dimethacrylate.

7. The method according to claim 4, wherein said crosslinked copolymer rubber is coagulated, prior to the graft polymerization, by adding thereto a coagulating agent to obtain coagulated rubber particles of from 0.12 to 0.3 micron in average.

References Cited
UNITED STATES PATENTS

| | | | |
|---|---|---|---|
| 3,264,373 | 8/1966 | Whitworth et al. | 260—876 R |
| 3,513,226 | 5/1970 | Hotta et al. | 260—876 R |
| 3,775,514 | 11/1973 | Amagi et al. | 260—876 R |
| 3,652,483 | 3/1972 | Tamaka et al. | 260—876 R |

PAUL LIEBERMAN, Primary Examiner

RICHARD B. TURNER, Assistant Examiner

U.S. Cl. X.R.

260—23.74, 41 C, 41.5 R, 45.75, 879, 880